Figure 1:
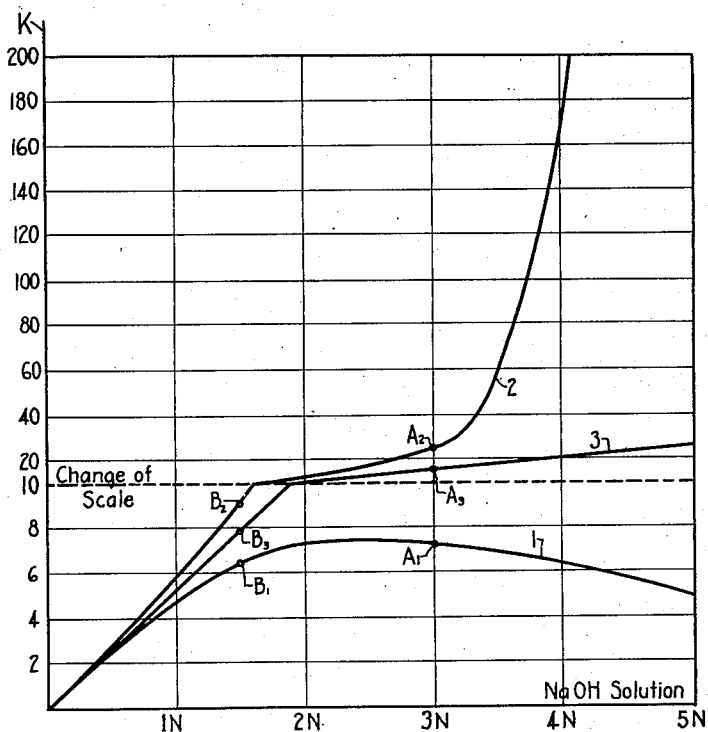

April 4, 1939.     D. L. YABROFF ET AL     2,152,724
PROCESS FOR THE REMOVAL OF MERCAPTANS FROM MERCAPTIDE SOLUTIONS
Filed Nov. 15, 1937

Inventors:
David Louis Yabroff
Ellis R. White
By their Attorney:

UNITED STATES PATENT OFFICE 2,152,724

PROCESS FOR THE REMOVAL OF MERCAPTANS FROM MERCAPTIDE SOLUTIONS

David Louis Yabroff, Berkeley, and Ellis R. White, Albany, Calif., assignors to Shell Development Company, San Francisco, Calif., a corporation of Delaware Application November 15, 1937, Serial No. 174,512

13 Claims. (Cl. 260—609)

This invention relates to the removal of mercaptans from alkaline reacting mercaptide solutions by steaming, and more particularly is concerned with the regeneration of spent caustic alkali solutions resulting from the extraction of mercaptans from hydrocarbon and similar organic liquids, containing mercaptides and substantial amounts of solubility promoters for mercaptans in water.

It is a purpose of this invention to carry out the removal of mercaptans by steaming under conditions to produce substantially regenerated solutions of caustic alkali suitable for the extraction of further amounts of mercaptans from hydrocarbon oils with a minimum consumption of steam.

It is known that the extraction of mercaptans from sour hydrocarbon oils and other organic liquids which are substantially immiscible with water, by means of aqueous solutions of caustic alkali is very incomplete, because the mercaptans have extremely low solubilities in water as well as acidities. In the co-pending applications Serial Nos. 102,892, filed September 28, 1936, 102,893, filed September 28, 1936, 118,920, filed January 2, 1937, 141,358, filed May 7, 1937, 124,690, filed February 8, 1937, and 170,422, filed October 22, 1937, we have disclosed that by the addition of certain solubility promoters to the aqueous caustic alkali solution, the extraction of mercaptans from the hydrocarbon and similar organic liquids can be improved very greatly, so that in many instances sweetening may be effected. The efficiency of extraction has been expressed by a factor K, K being $$\frac{\text{concentration of mercaptides in aqueous phase}}{\text{concentration of mercaptans in organic liquid phase}}$$

It has been shown that suitable solubility promoters combine the following properties: high specific solubility promoting power, i. e., ability to raise the solvent power of the aqueous caustic alkali for free mercaptans by a relatively large amount for a unit weight addition of the promoter to the aqueous caustic alkali; high solubility of the promoter in the aqueous caustic alkali; and very low solubility of the promoter in the hydrocarbon or other organic water insoluble liquid containing the mercaptans.

Among the many substances which combine the above properties in varying degrees the following were found most suitable: mono-, di- and tri-amino or hydroxy alkyl amines in which the alkyl groups contain 2 or 3 carbon atoms; polyhydric alcohols or derivatives thereof having at least 1 carbon atom in excess of polar radicals, a ratio of carbon atoms to hydroxyl radicals of at least 1½ and a ratio of carbon atoms to polar radicals not in excess of 2½, examples being propylene glycol, butylene glycols, alkyl glycerines in which the alkyl radical has from 2 to 4 carbon atoms, mono alkyl glycerine ethers in which the alkyl radical has from 1 to 4 carbon atoms, di- and tri-ethylene glycol, mono-, di- and tri-ethylene glycol mono alkyl ethers in which the alkyl radical has from 1 to 3 carbon atoms; diamino alcohols of 3 to 5 carbon atoms, etc. Very effective are also the alkali metal salts of certain carboxylic acids such as fatty acids having 2 to 6 carbon atoms, notably potassium isobutyrate, or of amino or hydroxy fatty acids having 3 to 7 carbon atoms especially potassium alpha hydroxyl n-butyrate; or of phenyl acetic acid, etc.

The amounts of solubility promoters normally employed in solution of the aqueous caustic alkali vary between the approximate limits of 15 to 85% and preferably 25 to 75% in the case of neutral and basic compounds. In the case of salts the aqueous caustic alkali is preferably substantially saturated therewith or at least nearly so.

Various caustic alkalis may be used. While alkali metal hydroxides are preferred, ammonia, quaternary ammonia bases, alkali metal carbonates, etc., may also be suitable. Regeneration of spent caustic alkali solutions containing mercaptides by steaming as herein taught is, however, restricted to caustic alkalis which are substantially non-volatile under the conditions of the steaming, and is particularly applicable to aqueous spent alkali metal hydroxide solutions containing alkali metal mercaptides.

The concentration of the caustic alkali for efficient extraction of the mercaptans from the hydrocarbon and similar liquids is preferably kept between about the limit of 2 to 10 normal, and the amount of caustic alkali solution containing solubility promoter may conveniently range from 5 to 100% by volume of the organic liquid to be extracted.

We have found that the efficiency of mercaptan removal by steaming from spent caustic alkali solutions containing mercaptides can be expressed by the following equation:

$$K_s = \frac{P_m}{P_{H_2O}} \cdot \frac{C}{K}$$

Where $$K_s = \frac{\text{concentration of mercaptan in vapor phase}}{\text{concentration of mercaptide in aqueous solution}}$$

$P_m$ = vapor pressure of pure mercaptan at a given temperature.

$P_{H_2O}$ = vapor pressure of water over the caustic alkali solution.

C = a constant.

$$K = \frac{\text{concentration of mercaptide in aqueous solution}}{\text{concentration of mercaptan in organic liquid}}$$

The factor K is the extraction factor hereinbefore referred to when extracting mercaptans from their solutions in organic water immiscible liquids with an aqueous solution of caustic alkali. It will be noted that under a given set of steaming conditions, steaming efficiency is inversely proportional to the extraction efficiency of the aqueous caustic alkali solution, and steaming efficiency is greatest under conditions which cause the K factor to become a minimum.

Among the important variables affecting K, the concentrations of the caustic alkali solution and solutizers are the most important. In Figure 1 a coordinate system is shown in which K is plotted on the ordinate against the normality of a caustic soda solution, when extracting normal butyl mercaptan from a gasoline. Three cases may be distinguished as indicated by curves 1, 2 and 3, respectively.

Curve 1 shows the change of K for the normal butyl mercaptan with concentration of the caustic soda solution in the absence of a solubility promoter. It begins at about zero value for K, rises approximately as a straight line over a short distance and then drops off with increasing normality of the caustic soda solution. This drop in the value of K in spite of increasing alkalinity of the aqueous solution beyond a certain point is due to the salting out of free mercaptans by the dissolved caustic soda in the aqueous solution, the free mercaptans being in equilibrium with the dissolved mercaptides.

Curve 2 represents the change of K with changing concentration of a caustic soda solution containing two parts by weight of sodium isobutyrate for each part of caustic soda. Obviously the ratio of caustic soda to isobutyrate remains the same over the entire range of concentrations up to the point of saturation of one of the dissolved components. This curve begins like curve 1 at about zero value for K but instead of dropping back, turns strongly upward. In other words the presence of the isobutyrate completely overcomes the salting out effect, and with increasing alkalinity of the solution and a proportionate increase in the isobutyrate concentration, K increases at a greater rate than is proportional to the increase of the normality of the caustic soda solution.

Curve 3 represents the boundary case in which the caustic soda solution contains the minimum amount of solubility promoter necessary to overcome the salting out effect and is therefore essentially a straight line.

When effecting steaming of an alkali mercaptide solution in various degrees of dilution, two factors must be taken into account, namely the steaming efficiency as represented by $K_s$ and the volume of solution to be steamed. While, in accordance with Figure 1, K is lowest, and consequently $K_s$ is highest for very low normality of the caustic alkali solution, a reduction in the normality by dilution is accompanied by an inversely proportional increase in the volume of the solution, and unless K is reduced more than proportionally nothing is gained by steaming in the diluted state. For instance, if the normality of a caustic soda solution be reduced from 2 to 1, by dilution with water, the volume of the solution is doubled, and unless K for normality 1 is less than ½ of that for normality 2, dilution does not facilitate steaming and on the contrary may consume more steam to achieve the same degree of stripping.

Referring again to curve 1 it will be seen that in the low normality range below about 1N, dilution has the effect of increasing the volume and lowering the K value in approximate inverse proportion. In the range of higher normality, however, the change in K is less than inversely proportional to the increase in volume, the latter resulting, within a certain range, in an increase in K. For example, K for a 3N caustic soda solution in the absence of a solubility promoter is 7.2 as indicated by point $A_1$. If now this caustic solution is diluted with an equal volume of water, the volume of the solution is doubled but the K is reduced only from 7.2 to 6.5, the latter point being indicated by $B_1$. This means that the steaming efficiency on the basis of equal volumes of caustic soda solution is improved by the factor $$\frac{7.2}{6.5} = 1.1$$

but on the basis of actual volumes the net efficiency is lowered by the factor 0.55.

If we now consider points $A_2$ and $B_2$ on curve 2 it will be seen that K is lowered from 25 to 9.2 upon diluting the caustic soda solution with an equal volume of water. This will result in a net improvement of the steaming efficiency based on actual volumes of $$\frac{25}{9.2 \times 2} = 1.36$$

times the original steaming efficiency.

A similar consideration of points $A_3$ and $B_3$ reveals that dilution as applied to curve 3 has no effect.

The above comparison clearly shows that dilution for the purpose of removing mercaptans from alkaline mercaptide solutions by steaming is beneficial for all mercaptide solutions which contain an amount of solubility promoter at least sufficient to compensate for the salting out of the free mercaptans by the caustic alkali and other normally solid inorganic substances which may be dissolved in the aqueous solution.

The minimum amounts of solubility promoters required to compensate the salting out are known to vary considerably with the type of mercaptans, heavier mercaptans being salted out more easily and consequently requiring somewhat larger minimum amounts of solubility promoters. Therefore where mixtures of mercaptans are involved the minimum amount of solubility promoter which must be present is that which will compensate the salting out of the average mercaptan or key component of the mercaptan mixture.

If it is desired to know these minimum amounts they are best determined experimentally for each individual case, because too many variables such as nature of the solubility promoter, nature and concentration of normally solid inorganic substances dissolved in the caustic alkali solution, type of mercaptans etc., are involved to make their determination by other methods feasible. It is, however, rarely necessary to determine them, since the amounts of solubility promoters employed in the extraction of mercaptans from hydrocarbon and similar liquids are normally very much larger than these minimum amounts.

In order further to improve the steaming efficiency we may conduct the steaming under considerable superatmospheric pressures. The problem of whether or not superatmospheric pressures are beneficial for the removal of mercaptans by steaming, depends on the relative rates of rise of the vapor pressures of mercaptans and water over alkaline mercaptide solution as well as the rate of change of K with increasing temperatures. We have found that in general the ratio of mercaptan to water pressures rises with the temperature for relatively heavy mercaptans, i. e., those having 4 or more carbon atoms, and remains substantially unchanged for the lighter mercaptans. Therefore, superatmospheric pressures are of greatest advantage in cases where the mercaptide solution contains substantial amounts of C₄ and heavier mercaptans.

If desired we add a limited amount of air to the steam for the purpose of converting at least a portion of the mercaptans to disulfides, thereby facilitating mercaptan removal.

In accordance with the principles hereinbefore explained the removal of mercaptans from aqueous alkaline mercaptide solutions containing amounts of solubility promoters at least sufficient to compensate the salting out of the free average mercaptan present by normally solid inorganic substances dissolved in the aqueous solution, comprises diluting the solution with an amount of water, blowing steam through the heated dilute solution under conditions to prevent substantial condensation of the steam, preferably above superatmospheric pressure, and reboiling the steamed diluted solution, so that preferably the original concentration of basic material in the solution is restored. The steam produced in the reboiling may be used for the steaming and the resulting foul steam containing mercaptans is condensed. The mercaptans are separated from the condensed water and the latter may be used to dilute the mercaptide solution.

Figure 2:
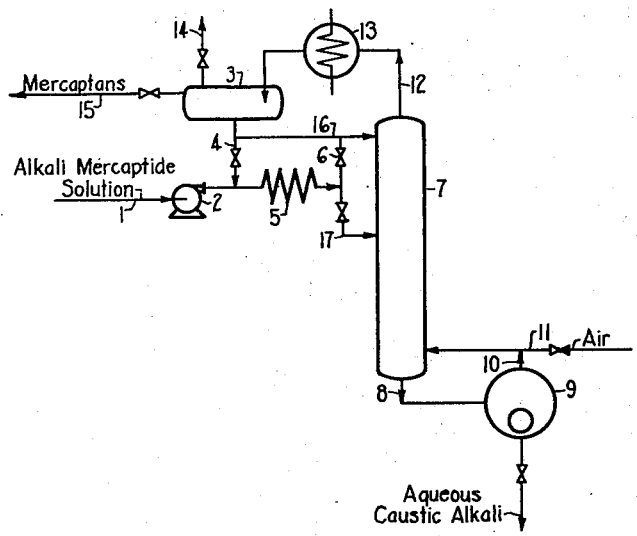

Referring now to Figure 2 which represents a simplified flow diagram of our process, aqueous caustic alkali containing mercaptides and an amount of solubility promoter sufficient to compensate the salting out of free mercaptans by the dissolved caustic alkali is admitted from a source not shown through line 1 to pump 2, which conveys the solution preferably under a substantial superatmospheric pressure through heater 5, where it is heated to its boiling temperature, and through line 6 into the top of column 7. Water of dilution may be added to the solution from tank 3 and line 4 at a convenient point in line 6.

Column 7 may be of conventional design adapted for the stripping of liquids by steaming and built to withstand the desired superatmospheric pressures. It preferably contains bubble plates, packing or other means for effecting a through contact of the liquid as it flows downward in countercurrent to the ascending steam. Stripped aqueous solution is transferred through bottom line 8 to reboiler 9 where it is boiled to vaporize an amount of water substantially equal to the amount introduced from tank 3 into the solution entering the top of column 7. Steam so produced passes through vapor line 10 into the bottom of column 7, to ascend through the column in countercurrent to the liquid solution.

If desired an amount of air may be admitted into line 10 from line 11 to be introduced into column 7 together with the stripping steam, to oxidize at least a portion of the mercaptans.

The presence of air has the advantage of reducing the mercaptide content of the regenerated solution to a materially lower figure for a certain steam consumption, than is possible without air, a portion of the mercaptides being converted to disulfides. The latter are neutral compounds and are expelled from the aqueous caustic alkali solution more easily than the mercaptans.

Care must, however, be taken to limit the content of air in the steam, so that oxidation of the solubility promoter is avoided. The susceptibility of different promoters to oxidation varies considerably, and the amount of air which may be admitted to the steam varies for different compounds. Moreover, oxidation obviously increases with rising temperatures and partial oxygen pressures. For instance, most of the amino bases may be oxidized quite easily at the temperatures of steaming. Since oxidation of a substantial portion of the promoter materially reduces the solvent power of the caustic alkali for mercaptans, the maximum permissible partial oxygen pressure in the steam-air mixture must be determined for each individual case, if air is to be used.

Selective oxidation of mercaptides to disulfides may be improved materially by the addition to the caustic alkali solution of oxidation catalysts which promote the oxidation of mercaptides to disulfides or a suitable catalyst may be coated on the bubble trays or on the packing of the column. Active catalysts are in particular the oxides and sulfides of the elements 23 to 31, i. e., vanadium, chromium, manganese, iron, cobalt, nickel, copper and zinc, and also of the elements cadmium and lead. Some catalysts such as copper oxide, however, have a tendency to dissolve in the caustic alkali solution particularly in the presence of certain solubility promoters such as amino bases. Soluble copper compounds may in turn be dissolved in the gasoline which is subsequently treated with the caustic alkali solution containing these copper compounds. Dissolved copper in gasoline has a tendency to render the latter gum unstable, and a wash with an aqueous alkali sulfide solution or redistillation of the gasoline may be required to separate the gasoline from the copper compounds. If desired a small amount of alkali sulfide may be dissolved in the caustic alkali solution to prevent the formation of soluble compounds of copper or other catalyst metals.

In the presence of catalysts an amount of oxygen about equimolal to the mercaptides in the caustic alkali solution is frequently sufficient to result in a material saving of steam for purposes of regeneration.

Liberated mercaptans together with steam and, if air is used, disulfides and residual air, are removed from the column 7 through vapor line 12, and are condensed in condenser 13. Condensate is collected in a separating tank 3, and residual air, if any, is released through vent line 14.

The liquid portion in tank 3 separates into water which may contain solubility promoter, and an oily liquid, the latter consisting essentially of mercaptans which may contain varying amounts of disulfides. The oily liquid is withdrawn through line 15, and water may be returned through lines 4 and 6 to heater 5 and column 7.

Neutral or basic reacting solubility promoters may be volatile to various degrees, and during steaming a substantial portion may be taken overhead and may be dissolved in the water of condensation. This may have the effect of causing at least a portion of the mercaptans to be dissolved in the water which would thus be returned to the column 7. Obviously this is undesirable, and in order to prevent vaporization of a substantial amount of vaporizable solubility promoters, we may return at least a portion of the water of condensation from tank 3 through line 16 to the top of column 7, to act as a reflux or scrubbing fluid in the upper portion of the column 7, which thereby becomes a reflux zone. In consequence of the refluxing the largest portion of solubility promoters contained in the steam is recondensed and dissolved in the water, and foul steam substantially free from the promoter, but containing the mercaptans, proceeds through line 12 as hereinbefore described. The heated caustic alkali mercaptide solution enters column 7 through line 17 at a point intermediate between top and bottom and is diluted by the reflux descending from the top.

Pressures usually employed in column 7 vary between about 15 to 200 pounds above atmosphere, although lower or higher pressures may be used. At pressures below about 15 pounds the improvement is normally insufficient to warrant the installation of compressors and the like, and with pressures greatly in excess of 200 pounds initial cost and maintenance are usually greater than the saving.

The amount of water available for diluting the mercaptide solution is limited by the amount of steam required in the steaming operation unless water from an outside source is added and a portion of the steam produced on reoiling is diverted for other purposes. For satisfactory regeneration of an aqueous solution of alkali metal hydroxide containing solubility promoter and mercaptides to make it suitable for use in the extraction of mercaptans from hydrocarbon oils, the amount of steam required is normally less than 30 pounds per gallon of solution and usually much below 25 pounds per gallon. This results in a dilution ratio of less than 4 to 1.

The saving of steam which may be had is well illustrated by the following example:

A California gasoline containing .36% mercaptan sulfur was extracted in two stages with 20% by volume of a 6-normal potassium hydroxide containing 400 grams per liter potassium isobutyrate. The extracted gasoline contained 0.00016% mercaptan sulfur and was sweet. The spent potassium hydroxide solution was then regenerated by steaming with and without diluting prior to passing steam through the solution. When steaming without dilution in a six plate stripper with one liquid volume of steam per volume of solution, the mercaptan sulfur content of the regenerated solution was found to be .44%. On the other hand when condensing the steam, separating the resulting water from mercaptans, returning the former to the caustic solution entering the stripper, and using the bottom plate of the stripper as a reboiler for the generation of the steam from the diluted solution, the mercaptan sulfur content of the regeneration was now reduced to .275%.

Further amounts of the sour gasoline containing .36% mercaptan sulfur were then extracted in two stages with 20% by volume of the regenerated solutions, and it was found that where the solution had been regenerated without dilution, the extracted gasoline contained .00038% mercaptan sulfur and was slightly sour, whereas where the solution had been regenerated in dilution the treated gasoline contained .00027% mercaptan sulfur and was sweet.

We claim as our invention:

1. In the process of removing mercaptans by steaming from an aqueous solution of a caustic alkali, which is substantially non-volatile under the conditions of the steaming, containing mercaptides and an amount of a solubility promoter for mercaptans in water at least sufficient to compensate the salting out of the average mercaptan from the aqueous caustic alkali solution, the improvement comprising diluting the solution with water and passing direct steam through the diluted solution under conditions to prevent substantial condensation of the steam.

2. The process of claim 1 in which the steaming is carried out under superatmospheric pressure.

3. In the process of removing mercaptans by steaming from an aqueous solution of a caustic alkali which is substantially non-volatile under the conditions of the steaming, containing mercaptides and an amount of a solubility promoter for mercaptans in water at least sufficient to compensate the salting out of the average mercaptan from the aqueous caustic alkali solution, the improvement comprising diluting the solution with water and passing direct steam containing air in an amount insufficient substantially to oxidize said promoter, through the diluted solution under conditions to prevent substantial condensation of the steam.

4. The process of claim 3 in which the caustic alkali solution contains a catalyst capable of promoting oxidation of mercaptides to disulfides.

5. In the process of removing mercaptans by steaming from an aqueous solution of a caustic alkali which is substantially non-volatile under the conditions of the steaming, containing mercaptides and an amount of a solubility promoter for mercaptans in water at least sufficient to compensate the salting out of the average mercaptan from the aqueous caustic alkali solution, the improvement comprising diluting said solution with water of condensation from the steaming, passing stripping steam through the diluted solution under conditions to prevent substantial condensation thereof, to produce a foul steam containing mercaptans and a stripped solution, separating the foul steam from the solution, reboiling the stripped solution to produce said stripping steam, condensing the foul steam and separating the resulting water of condensation from the mercaptans.

6. In the process of removing mercaptans by steaming from an aqueous solution of a caustic alkali containing mercaptides and an amount of a solubility promoter for mercaptans and water at least sufficient to compensate the salting out of the average mercaptan from the aqueous caustic alkali solution, said caustic alkali and promoter being substantially non-volatile under the conditions of the steaming, the improvement comprising diluting said solution with water of condensation from the steaming, heating the diluted solution to its boiling temperature, passing the heated diluted solution through a stripping zone in countercurrent to stripping steam to produce a stripped solution and a foul steam containing mercaptans, separating the foul steam from the solution, reboiling the stripped solution to produce said stripping steam by vaporizing an amount of water approximately equal to that used for diluting the solution, condensing the foul steam and separating the resulting water of condensation from the mercaptans.

7. In the process of removing mercaptans by steaming from an aqueous solution of a caustic alkali which is substantially non-volatile under the conditions of the steaming, containing mercaptides and an amount of a vaporizable solubility promoter for mercaptans in water at least sufficient to compensate the salting out of the average mercaptan from the aqueous caustic alkali solution, the improvement comprising heating said solution to its boiling temperature, passing the heated solution through a stripping zone in countercurrent to stripping steam to produce a stripped solution and foul steam containing mercaptans and solubility promoter, separating the foul steam from the solution, reboiling the stripped solution to produce said stripping steam by vaporizing an amount of water approximately equal to said water of condensation, passing the foul steam through a refluxing zone in countercurrent to water of condensation to remove from the steam the largest portion of solubility promoter, thereby producing a residual foul steam substantially free from solubility promoter and an aqueous solution of solubility promoter, introducing the latter into the stripping zone to join the heated caustic alkali solution thereby diluting same, condensing the residual foul steam to produce said water of condensation, separating mercaptans from the water and returning at least a portion of the latter to the refluxing zone as reflux.

8. In the process of removing mercaptans by steaming from an aqueous solution of a caustic alkali, which is substantially non-volatile under the conditions of the steaming, containing mercaptides and an amount of a solubility promoter for mercaptans in water at least sufficient to compensate the salting out of the average mercaptan from the aqueous caustic alkali solution, the improvement comprising diluting the solution with water, passing stripping steam through the diluted solution in direct contact therewith under conditions to prevent substantial condensation of the steam, and reboiling the stripped solution to remove water of dilution.

9. The process of claim 8 in which the solution of caustic alkali containing mercaptides is diluted with less than four volumes of water.

10. In the process of removing mercaptans by steaming from an aqueous solution of a caustic alkali which is substantially non-volatile under the conditions of the steaming, containing mercaptides and an amount of a solubility promoter for mercaptans in water at least sufficient to compensate the salting out of the average mercaptan from the aqueous caustic alkali solution, the improvement comprising diluting said solution with water, passing stripping steam through the diluted solution under conditions to prevent substantial condensation thereof, to produce a foul steam containing mercaptans and a stripped solution, separating the foul steam from the solution, and reboiling the stripped solution to produce said stripping steam.

11. In the process of removing mercaptans by steaming from an aqueous solution of a caustic alkali, which is substantially non-volatile under the conditions of the steaming, containing mercaptides and an amount of a solubility promoter for mercaptans in water at least sufficient to compensate the salting out of the average mercaptan from the aqueous caustic alkali solution, the improvement comprising diluting the solution with water, passing stripping steams substantially free from free oxygen through the diluted solutions under conditions to prevent substantial condensation of the steam and thereafter reboiling the resultant stripped solution to remove water of dilution.

12. In the process of removing mercaptans by steaming from an aqueous solution of a caustic alkali, which is substantially non-volatile under the conditions of the steaming, containing mercaptides and an amount of a solubility promoter for mercaptans in water at least sufficient to compensate the salting out of the average mercaptan from the aqueous caustic alkali solution, the improvement comprising diluting the solution with water, and boiling the diluted solution to vaporize mercaptans and to remove water of dilution.

13. In the process of removing mercaptans by steaming from an aqueous solution of a caustic alkali, which is substantially non-volatile under the conditions of the steaming, containing mercaptides and an amount of a solubility promoter for mercaptans in water at least sufficient to compensate the salting out of the average mercaptan from the aqueous caustic alkali solution, the improvement comprising diluting the solution with water, and boiling the diluted solution to vaporize mercaptans and to remove an amount of water substantially equal to that used for dilution.

DAVID LOUIS YABROFF.
ELLIS R. WHITE.